Aug. 30, 1966          W. BRAUN          3,270,051
DUAL STEP UREA PRODUCTION
Filed Aug. 14, 1962
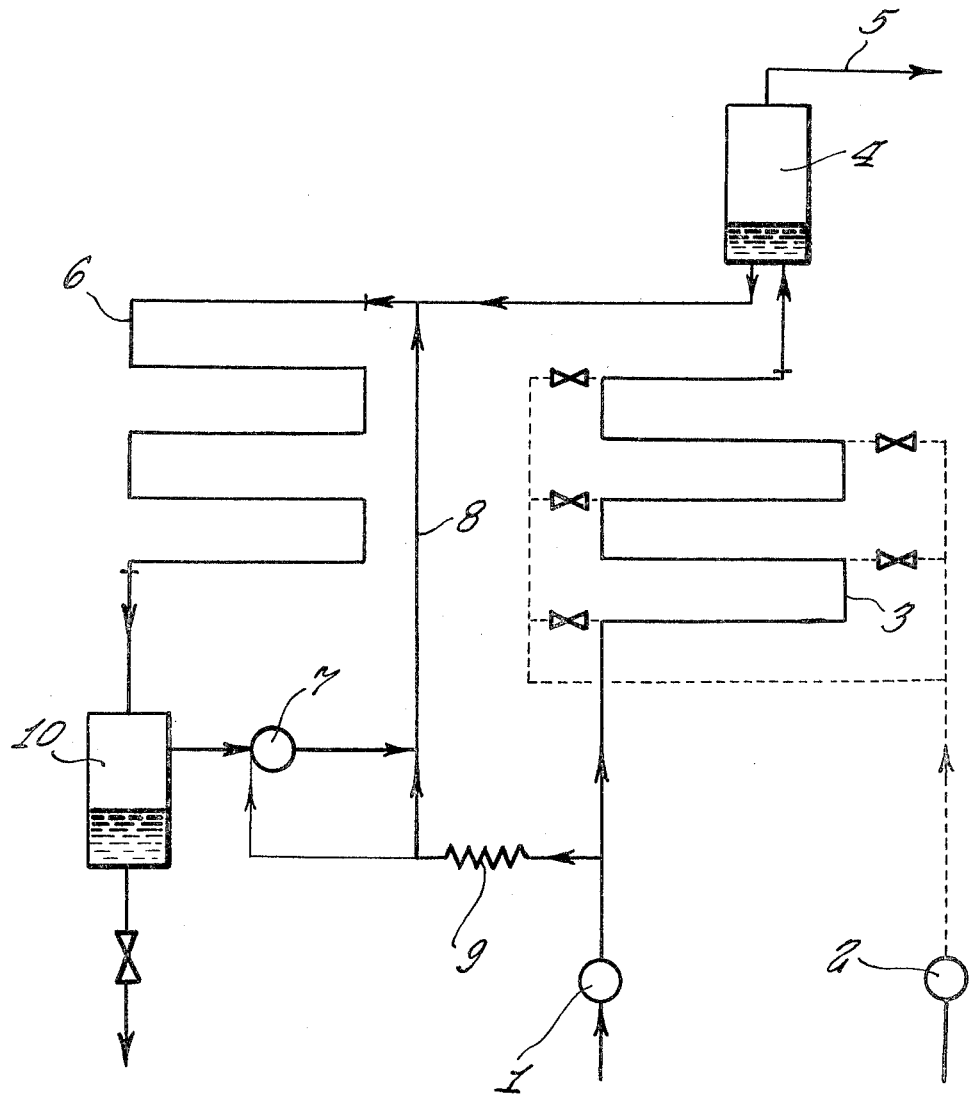
INVENTOR.
WILHELM BRAUN
BY
Mestern & Kollin
ATTORNEYS United States Patent Office 3,270,051
Patented August 30, 1966

3,270,051
DUAL STEP UREA PRODUCTION
Wilhelm Braun, Lucerne, Switzerland, assignor to Inventa A.G. für Forschung und Patentverwertung, Zurich, Switzerland
Filed Aug. 14, 1962, Ser. No. 218,208
1 Claim. (Cl. 260—555)

The invention relates to a novel process of producing urea and to an apparatus used in this synthesis, and more particularly to the use of more than one reaction chamber for that process. It is a continuation-in-part of my co-pending application Serial Number 809,708, filed April 29, 1959, now abandoned.

The production of urea from ammonia and $CO_2$ under pressure commonly is carried out in a single vessel. Hence, two reactions occur in the same reaction space. The first of these, the formation of ammonium carbamate, is considerably exothermic whereas the second, the formation of urea with simultaneous elimination of water, requires a minor amount of heat. The exothermic reaction should take place at low temperatures, and the endothermic one at elevated temperatures. A clear-cut optimum for both reactions cannot be attained with the two reactions occurring in the same vessel.

The feasibility of attaining this goal is even more diminished by the turbulence of the reaction mixture which is due to the vehemence of the exothermic ammonium carbamate formation. This prevents all the reactants from remaining in the vessel for the required period of time, i.e., part of the ammonia, of the $CO_2$ and of the carbamate, leave the reaction space after too short a dwelling time whereas a portion of the reaction mixture remains therein too long. This favors the undesirable formation of biuret, a secondary reaction. It is known that this secondary reaction can be slowed by an excess $NH_3$. Also, this excess effects a higher reaction yield of ammonium carbamate to urea. However, if the customary converter is employed in the urea synthesis, the excess ammonia is not fully utilized because the $NH_3$, being in a hypercritical state, traverses the reactor comparatively speedily, and the excess, present upon entry, is not maintained during the dwelling time provided. The excess ammonia thereby increases the amount of waste gases which, according to the known processes, can be reintroduced into the reaction only by means of a partial or total pressure release.

The term "hypercritical" as employed in connection with the instant invention, is meant to denote that the gas remains under pressure and is not allowed to expand.

It had previously been attempted to recirculate the rest gases after the pressure release and after the decomposition of the ammonium carbamate at elevated temperatures and with the use of compressors. This has not been found successful because of local cooling and consequent deposition of solid ammonium carbamate in the compressor valves. Another means of recirculation consists in pumping ammonium carbamate in liquid ammonia and water back into the autoclave. In order to carry out this method, the ammonium carbamate must be decomposed, distilled from the synthesis mixture of $CO_2$ and $NH_3$, conducted through condensers, dissolved in liquid ammonia with addition of water or suspended therein, and returned into the autoclave by means of special pumps.

It now has been found that urea can be produced by the reaction of $NH_3$ and $CO_2$ by way of ammonium carbamate while carrying off the heat occurring during the formation of the latter and in the presence of excess ammonia at elevated pressures and temperatures. This is accomplished by adding an excess $NH_3$ to the ammonium carbamate melt in a reaction chamber whereby a portion of the ammonia in hypercritical state is taken directly from the synthesis mixture and is recirculated entirely or partially into the reaction chamber.

It should be stressed again that the term "hypercritical" denotes that the gas is circulated without expanding it but under the prevailing pressure. In principle, the ammonium carbamate required for the synthesis of urea can be made in any known manner, e.g., by reacting $CO_2$ and $NH_3$ in a reaction vessel while cooling. Naturally, it is of advantage to cool the mixture only to such an extent that the ammonium carbamate formed is in a molten state so that it can be transported into a connected second reaction vessel by pumping or just by the action of the pressure maintained. In the second vessel, the conversion to urea takes place under addition of excess ammonia. It is advantageous, however, to manufacture the ammonium carbamate in a tube system capable of cooling into which $CO_2$ and $NH_3$ are introduced stepwise at elevated pressures and temperatures. In principle, $CO_2$ and $NH_3$ can be introduced in the individual tube sections whereby the heat of reaction is carried off by cooling the pipe section following the spot on which the introduction takes place. It is easier to conduct through the entire tube or pipe system the total amount per time unit of one of the reactants according to the quantity of carbamate desired and to enter the other reactant stepwise while carrying off the heat of reaction at every step. Between the pipe system for the formation of ammonium carbamate and the reactor in which the latter is converted into urea, a separator advantageously is installed through which inert gases (if present) can be removed. The carbamate melt, divested of insert gases, best is conducted into the second reactor at the same pressures and temperatures as prevail in the carbamate step. The second reactor should also be in tube form in order to preclude too long a dwelling time. In the second reactor simultaneously excess ammonia is entered. The addition of the excess ammonia may be directly into this second reactor or together with the carbamate melt. Of course, the second reactor must be heated, and the heat formed in the first reaction step, the carbamate step, which can be obtained in the form of steam, may be ultilized.

The temperature of the reaction mixture during the formation of ammonium carbamate should be between its melting point and 170° C. (which is the maximum). Pressures applied are 100–300 atmospheres. The conversion of ammonium carbamate is carried out at pressures of 100–300 atmospheres and at temperatures of 170–200° C.

At a large excess of ammonia and, hence, a high rate of conversion of ammonium carbamate to urea (calculated on the $CO_2$ entered), the larger quantity of water, formed simultaneously, dissolves the comparatively small amount of $CO_2$ remaining in the carbamate almost completely. An analysis of the reaction mixture in the gas space of a separator installed behind the reactor showed that the gas mixture (aside from the steam corresponding to the temperature) consists of 99.7–98.7 vol. percent of free $NH_3$ and of 0.3–1.3 vol. percent $CO_2$, whereas in the sump of the separator (by weight) 40 percent urea, 12 percent $H_2O$, 40 percent $NH_3$ and 8 percent $CO_2$ were present. The free gaseous ammonia which also is present in the converter and contains only 1 percent $CO_2$ by volume, at the comparatively high reaction temperature and after separation from the sump phase does not tend to facilitate a separation of solid ammonium carbamate. Hence, it can be taken from the gas space of the separator and recompressed by means of a valveless blower or an injector and returned to the reaction chamber. The difference in pressure is slight so that not much of a recompression is required.

The invention now will be further explained by means of the following examples and with reference to the accompanying drawing. However, it should be understood that these are given merely by way of illustration, not of limitation, and that numerous changes may be made in the details without departing from the spirit and the scope of the present invention as hereinafter claimed.

Example 1

Liquid ammonia is introduced by means of pump 1 into a dual-wall pipe system 3 clad with stainless steel or with an alloy of predominantly chromium and nickel with or without molybdenum and comparatively little iron. Then, by means of a pump or compressor 2, enough $CO_2$ is introduced stepwise that the heat of reaction can be carried off through the wall of the corresponding pipe section and can be recovered in the form of steam. The temperature of the reaction mixture should be above the melting point of ammonium carbamate but should not exceed 170° C. The pressure is 195 atmospheres. The carbon dioxide is added until stoichiometric proportions have been attained, i.e., until both components have been converted to ammonium carbamate. The liquid ammonium carbamate is conducted to separator 4 from which any inert gases which may be present in the $CO_2$ can be removed through pipe 5. The ammonium carbamate melt then flows into a second, heated pipe system 6 which is held at a temperature of approximately 175° C. and at substantially the same pressure as the system 3. In this second pipe system 6 the ammonium carbamate from system 3 is entered and also, by way of pipe 8, those quantities of ammonia which are recirculated by way of blower 7 from separator 10, and, furthermore, those quantities which exceed the stoichiometric proportions in system 3 and correspond to the difference of the sump analysis given above. The small $CO_2$ content in the ammonia can present difficulties in the stuffing box of the blower. This can be avoided by adding a partial stream of the ammonia, preheated to reaction temperature by heater 9, through a first stuffing box preceding the stuffing box referred to above.

Example 2

In the apparatus as described in Example 1, stepwise and simultaneously $NH_3$ and $CO_2$ are entered in stoichiometric proportions and in such quantities that the heat of reaction can be carried off. The pressure is 260 atmospheres. The ammonium carbamate melt formed passes through separator 4 and flows into pipe system 6 which is held at a temperature of 195° C. The amount of fresh ammonia added by way of pipe 8 is under higher pressures, e.g., at 280 atmospheres, and drives an injector (instead of using the blower 7) which recirculates the undissolved ammonia from separator 10 into pipe system 6. The reaction yield, calculated on the $CO_2$ entered, is 75 percent. Whereas in a single converter and with a slight excess $NH_3$ over the stoichiometric proportions, a conversion of carbamate to urea does not exceed approximately 50 percent, the conversion in the device according to the instant invention and with an $NH_3$ excess of approximately 225 percent rises to 71–75 percent. The $CO_2$ content in the final mixture thereby decreases from 800 kg. to 300 kg. per ton urea. Without the direct recirculation as described, the $NH_3$ content would increase from 800 to 2,000 kg. per ton urea. Of these 2,000 kg., 1,000 kg. can be recirculated through the blower 7 so that in the final mixture only 1,000 kg. $NH_3$ are present.

In a urea synthesis in which the waste gases of $NH_3$ and $CO_2$ from the sump are not carried back into the reactor, but are utilized for other purposes, e.g., converted into ammonium nitrite or ammonium sulfate, the following advantages are obtained by the process according to the present invention:

(1) In both pipe systems, no portion of the reactants can pass the reactor without remaining therein for the prescribed dwelling time. This increases the yield over the single converter process in that an unduly long dwelling time also is prevented so that a reduction of biuret formation is attained.

(2) In the pipe system for the urea reaction, the ratio of excess ammonia is maintained during the entire dwelling time, in contrast to the single converter process. The required reaction time is thereby shortened.

(3) The quantity of $CO_2$ lost in the process decreases by 60 percent.

(4) The electric current consumption decreases by approximately 30 percent.

I claim as my invention:

In a process for the manufacture of urea wherein ammonium carbamate is produced in a first reaction zone from stoichiometrical amounts of $CO_2$ and $NH_3$ at pressures of 100 to 300 atmospheres and at temperatures of 153 to 170° C., and said carbamate is converted to urea with an excess $NH_3$ in a second reaction zone at substantially like pressures and at temperatures of 170 to 200° C., the improvement which consists of supplying said excess $NH_3$ by partial recirculation of residual $NH_3$ from said first into said second reaction zone while in hypercritical state, and partly from residual $NH_3$ from said second reaction zone.

No references cited.

HENRY R. JILES, *Primary Examiner.*

NICHOLAS S. RIZZO, *Assistant Examiner.*